(12) United States Patent
Chu et al.

(10) Patent No.: US 8,721,119 B2
(45) Date of Patent: May 13, 2014

(54) LED MODULE DESIGN

(75) Inventors: Sidney Chun Kit Chu, Kowloon (HK);
Chew Tong Fatt, Penang (MY); Oon Siang Ling, Penang (MY)

(73) Assignee: GT Biomescilt Light Limited, Kowloon, Hong Kong (CN)

( * ) Notice: Subject to any disclaimer, the term of this patent is extended or adjusted under 35 U.S.C. 154(b) by 774 days.

(21) Appl. No.: 12/847,811

(22) Filed: Jul. 30, 2010

(65) Prior Publication Data

US 2011/0181495 A1    Jul. 28, 2011

Related U.S. Application Data

(63) Continuation-in-part of application No. 12/693,315, filed on Jan. 25, 2010.

(51) Int. Cl.
*F21S 8/02* (2006.01)

(52) U.S. Cl.
USPC ............. 362/249.03; 362/249.04; 362/249.02

(58) Field of Classification Search
USPC ............... 362/249.01, 249.02, 97.3, 630, 631
See application file for complete search history.

(56) References Cited

U.S. PATENT DOCUMENTS

| | | | | |
|---|---|---|---|---|
| 6,454,572 | B1 * | 9/2002 | Konetski et al. | 439/66 |
| 6,677,918 | B2 * | 1/2004 | Yuhara et al. | 345/1.3 |
| 2005/0054235 | A1 * | 3/2005 | Miller | 439/372 |
| 2005/0170680 | A1 * | 8/2005 | Miller | 439/372 |
| 2008/0244944 | A1 * | 10/2008 | Nall et al. | 40/544 |
| 2011/0096525 | A1 * | 4/2011 | Brondt et al. | 362/20 |
| 2011/0102304 | A1 * | 5/2011 | Nelson | 345/46 |
| 2011/0267827 | A1 * | 11/2011 | Wein | 362/368 |
| 2012/0002357 | A1 * | 1/2012 | Auld et al. | 361/679.01 |
| 2012/0062540 | A1 * | 3/2012 | Quadri et al. | 345/211 |

* cited by examiner

*Primary Examiner* — Diane Lee
*Assistant Examiner* — Gerald J Sufleta, II
(74) *Attorney, Agent, or Firm* — McDermott Will & Emery LLP

(57) ABSTRACT

A light emitting diode (LED) display screen including a plurality of LED display modules is disclosed. Each of the plurality of LED display modules includes a flexible substrate having a first surface and a second surface, opposite to the first surface, on which a plurality of LEDs are disposed; a power cable having a socket or a plug, the power cable being disposed on the first surface; a data cable having a socket or a plug, the data cable being disposed on the first surface; a magnet disposed on the first surface; and a plurality of connectors fixed to the flexible substrate, the plurality of connectors being disposed on the first surface and including a male connector and a female connector. A height of the magnet from the first surface of the flexible substrate is higher than heights of any components disposed on the first surface.

16 Claims, 13 Drawing Sheets

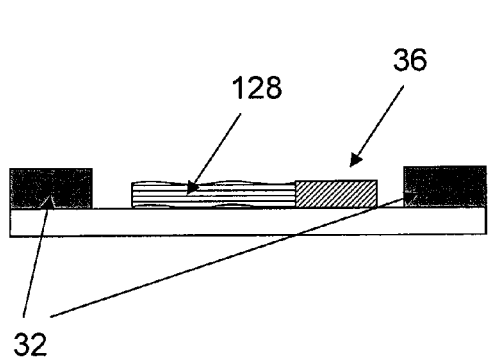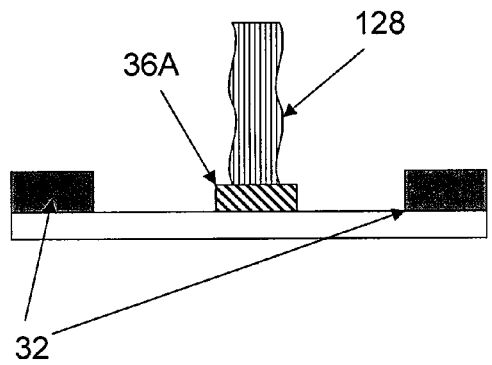
FIG. 16A   FIG. 16B (Prior Art)
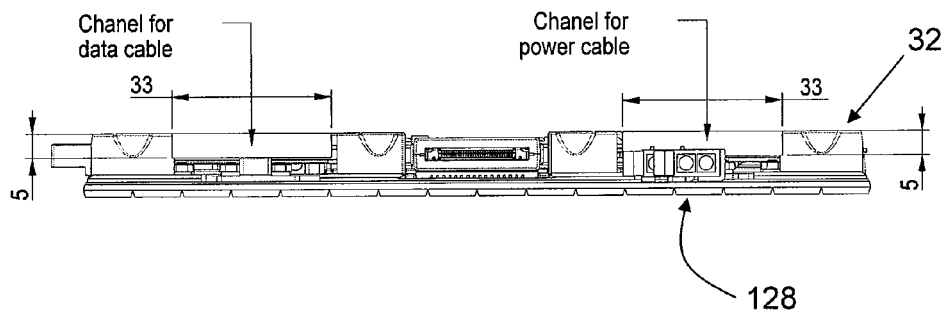
FIG. 16C
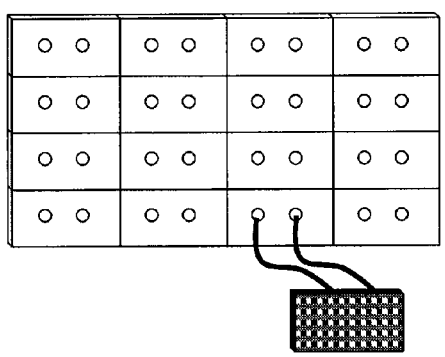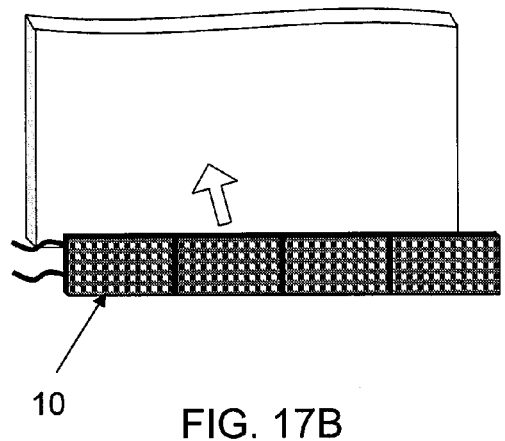
FIG. 17A (Prior Art)   FIG. 17B

LED MODULE DESIGN

RELATED APPLICATION

This application is Continuation-in-Part under 35 U.S.C. §120 of application Ser. No. 12/693,315 filed Jan. 25, 2010, the entire of which is incorporated by reference herein.

TECHNICAL FIELD

The present disclosure generally relates to flexible display screens comprising light emitting elements, such as light emitting diodes (LEDs). In particular, but not exclusively, embodiments of the present disclosure relate to waterproof, flexible LED display screen modules and systems for accurately connecting such modules.

BACKGROUND

Light emitting elements in the form of LEDs are widely used in display screens, particularly for large scale applications. Larger scale applications include advertising screens, information screens, such as, but not limited to, those in building lobbies, airports, train stations and the like and for entertainment purposes, such as, but not limited to, those used at concerts and in television studios.

With reference to FIG. 1A, to achieve the large display screens typically required for such applications, one type of large LED display screen 2 comprises a plurality of smaller display modules 4a, 4b which are coupled together. Such modules must be physically held together in the desired formation to form the finished complete screen. The modules must also be coupled together with regard to both power and data transmission so as to power the LEDs 6 of each module and to cause the array of LEDs on each module to display the respective portion of the overall images being displayed.

Larger scale LED display screens are producing higher resolution images by reducing the LED pitch size, i.e., by reducing the distance between the centers of adjacent LEDs and hence increasing the number of LEDs per unit area. As the pitch size decreases, it is increasingly important to accurately align adjacent display modules. Misalignment of modules results in distorted images being displayed and thus the image quality is impaired. Improving or even maintaining image quality in the presence of decreasing LED pitch size is becoming increasingly important and difficult.

Many applications require LED display screens to conform to one or more curved surfaces. With reference to FIG. 1B, when the screen 2 is bent to conform to a curved surface, display module 4a is at an angle to display module 4b, such that the pitch size between the LEDs 6 at the connecting points of the adjacent modules is different from the pitch size within each module, which also leads to distorted images. A gap 8 is also created between adjacent modules, which is unsightly and produces a display screen with poor aesthetics. Existing display module coupling systems cannot maintain the proper LED pitch size between adjacent modules.

Some display screens are flexible, which is achieved by using suitable materials that enable the individual display modules forming the screen to bend. However, as shown in FIG. 1B and as noted above, bending the display modules changes the pitch size between adjacent modules resulting in distorted images being displayed. The problem is exacerbated with increasing curvature of the modules.

Some known methods of coupling LED display modules for flexible large scale displays comprise interlocking ridge and lip arrangements. However, these methods do not maintain the desired or proper pitch size between adjacent modules. At least some of these methods also have the drawback that access to the modules from the front of the module, for example, for maintenance or test purposes, is not possible. Therefore, access must be via the rear of the module. Since the displays are often mounted to a curved surface, access from the rear can also be difficult, if not impossible. Therefore, in some cases, the displays must be dismantled and/or removed from their mounting to permit access.

Another problem with conventional flexible displays is that the power and logical connections at the rear of the multiple modules can be cluttered, which can be time consuming to disconnect and diagnose problems during maintenance. This problem is exacerbated with the size of the display and the increasing numbers of modules.

Where large scale LED displays are used in external environments, another requirement is that the LED screens and their components need to be waterproof.

Accordingly, it is one of objectives of the present disclosure to provide a system and/or method and/or apparatus for coupling LED display modules that address or at least ameliorate one or more of the aforementioned problems of the prior art, and to provide consumers with a useful commercial alternative.

SUMMARY

Embodiments of the present disclosure generally relate to light emitting diode (LED) display modules, display screens comprising a plurality of display modules and methods of forming display screens wherein the display modules comprise a plurality of connectors coupled to a flexible substrate for connecting a plurality of the display modules together such that horizontal and vertical alignment of the display modules and the LED pitch size are maintained during flexing of the display screen to avoid distortion of the displayed image.

According to one aspect of the present disclosure, although not necessarily the broadest aspect, a light emitting diode (LED) display module comprises a flexible substrate supporting a plurality of LEDs, and a set of connectors coupled to the flexible substrate for connecting the display module to respective connectors of one or more adjacent display modules. The connectors comprise at least one male connector and at least one female connector.

According to another aspect of the present disclosure, although not necessarily the broadest aspect, a light emitting diode (LED) display screen comprises a plurality of LED display modules, each display module comprising a flexible substrate supporting a plurality of LEDs and a set of connectors coupled to the flexible substrate for connecting one of the display modules to respective connectors of one or more adjacent display modules. The connectors comprise at least one male connector and at least one female connector.

According to a further aspect of the present disclosure, although not necessarily the broadest aspect, a method for forming a display screen comprising a plurality of LED display modules, each display module comprising a flexible substrate supporting a plurality of LEDs and a set of connectors coupled to the flexible substrate. The method includes connecting at least one of the set of connectors of one of the display modules to a respective connector of an adjacent display module such that horizontal and vertical alignment of the display modules is maintained during flexing of the display screen. The connectors comprise at least one male connector and at least one female connector.

Suitably, the set of connectors comprises at least one male connector and at least one female connector.

Preferably, the set of connectors comprises at least one connector at each edge of the display module.

Suitably, at least one of the female connectors and/or at least one of the male connectors protrudes beyond an edge of the display module.

Suitably, at least one male connector and/or at least one female connector does not protrude beyond an edge of the display module.

Preferably, at least one female connector is adjacent an edge of the flexible substrate opposite an edge of the flexible substrate having at least one male connector.

Preferably, each female connector comprises an aperture for receiving a projection of a respective aligned male connector of an adjacent display module.

Suitably, the at least one male connector and the at least one female connector connect adjacent display modules such that an LED pitch size of each display module is maintained between adjacent display modules, when the display modules are bent.

Preferably, at least the connectors are aligned with reference marks on the flexible substrate for horizontal and vertical alignment of adjacent display modules to ±3% of an LED pitch size of the display modules.

Preferably, a flexible housing plate can be mounted to a first side of the flexible substrate.

Preferably, a flexible cover can be mounted to a second side of the flexible substrate.

Suitably, at least one magnet can be coupled to the flexible housing plate for attaching the display module to a surface.

Preferably, a data plug and a data socket can be coupled to the flexible substrate.

Preferably, a power connector is coupled to the flexible substrate.

Preferably, at least one channel is provided in the flexible housing plate for accommodating one or more cables.

Suitably, at least one cable restraint is adjustably coupled to the flexible housing plate.

Preferably, the display module is waterproof.

Suitably, the display module further comprises one or more elongated strengthening members, preferably in the flexible housing plate, to prevent over bending of the display module.

In yet another aspect of the present disclosure, a light emitting diode (LED) display module may include a flexible substrate having a first surface and a second surface which is opposite to the first surface and on which a plurality of LEDs are disposed. The module further includes a power cable including a socket or a plug, for providing power to the display module and the power cable is disposed on the first surface. The module includes a data cable including a socket or a plug, for providing a data signal for displaying image on the display module to the display module and the data cable is disposed on the first surface. The display module may includes a magnet disposed on the first surface, and a plurality of connectors fixed to the first surface of the flexible substrate. The plurality of connectors may include a male connector and a female connector. The LED display module may further comprise a housing plate disposed on the first surface. The magnet may include a plurality of magnets disposed along a periphery of the flexible substrate.

It is preferable the power cable is configured to be connected to a power cable of another display module in a direction parallel to the first surface, and the data cable is configured to be connected to a data cable of another display module in a direction parallel to the first surface. In other words, the power cable and/or the data cable are not configured be perpendicularly connected from above.

Further, it is preferable that a height of the power cable and/or a height of the data cable from the first surface of the flexible substrate are not higher than heights of any components disposed on the first surface of the flexible substrate. Further, it is preferable that a height of the magnet from the first surface of the flexible substrate may be equal to or higher than heights of any components disposed on the first surface.

The power cable extends beyond the flexible substrate of the display module. The data cable may include a first data cable and a second data cable, and the first data cable includes the plug and the second data cable includes a socket.

In the LED display module, the plurality of connectors may comprise a first male connector and a second male connector, and a first female connector and a second female connector, and structures of the first male connector and the second male connector may be different and structures of the first female connector and the second female connector may be different. For example, the first male connector may comprises a base portion having an aperture for receiving a fastener for fixing the male connector to the flexible substrate; a head portion extending the base portion and having a step for being rested on the housing plate; and a projection disposed on the head portion to be inserted into a hole. The second male connector may comprise an L-shape base portion having an aperture for receiving a fastener for fixing the male connector to the flexible substrate; and a projection disposed on the L-shaped head portion to be inserted into a hole. The L-shaped base portion is fixed to the flexible substrate without interposing the housing plate.

The first female connector may comprise a base portion having an aperture for receiving a fastener for fixing the female connector to the flexible substrate; a head portion extending the base portion and having a step for being rested on the housing plate; and a hole disposed on the head portion to receive a projection. The second female connector may comprise an L-shape base portion having an aperture for receiving a fastener for fixing the female connector to the flexible substrate, and a hole portion disposed on the L-shaped head portion to receive a projection. The L-shaped base portion is fixed to the flexible substrate without interposing the housing plate.

The first male connector may be connected to the first female connector or the second female connector of one of adjacent display module, and the second connector may be connected to the first female connector or the second female connector of one of adjacent display module.

The display module may further comprise a strengthening member to restrict a bending amount of the display module. When the strength member is used, a difference between a pitch of the LEDs crossing a borderline of the display modules and a pitch of the LEDs within the display modules may be less than 3% when the bending amount of the display module is restricted by the strengthening member.

According to another embodiment of the present disclosure, a light emitting diode (LED) display screen comprising a plurality of LED display modules, and each of the plurality of LED display modules comprises a flexible substrate having a first surface and a second surface, opposite to the first surface, on which a plurality of LEDs are disposed; a power cable having a socket or a plug, for providing power to the display module, the power cable being disposed on the first surface; a data cable having a socket or a plug, for providing data signal for displaying image on the display module to the display module, the data cable being disposed on the first surface; a magnet disposed on the first surface; and a plurality of connectors fixed to the flexible substrate, the plurality of connectors being disposed on the first surface and including a male connector and a female connector. The male connector of one of the display modules is connected to the female connector of adjacent one of the plurality of display modules.

It is preferable that a height of the power cable from the first surface of the flexible substrate is less than a height of the magnet from the first surface of the flexible substrate, and a height of the data cable from the first surface of the flexible substrate is less than a height of the magnet from the first surface of the flexible substrate. A height of the magnet from the first surface of the flexible substrate may be higher than heights of any components disposed on the first surface.

The socket of the power cable of one of the display modules is connected to the plug of the power cable of adjacent one of the display modules. The data cable may include a first data cable having the plug and a second data cable having the socket, and the socket of one of the display modules is connected to the plug of adjacent one of the display modules.

The LED display screen may further comprise a power unit for supplying power to the plurality of display module. The power cable may be connected to the power unit by a plurality of connecting cables each of which is connected to the power cable of different display modules.

The LED display screen may also include a data unit for supplying data signals to the plurality of display module, and the data cable is connected to the data unit by a plurality of connecting cables each of which is connected to the data cable of different display modules.

Further features and aspects of the present disclosure will become apparent from the following detailed description.

BRIEF DESCRIPTION OF THE DRAWINGS

In order that the subject matter of the present disclosure may be readily understood and put into practical effect, reference will now be made to embodiments of the present disclosure with reference to the accompanying drawings, wherein like reference numbers refer to identical elements. The drawings are provided by way of example only, wherein:

FIG. 16A and FIG. 16C illustrate an exemplary configuration of a power cable, and FIG. 16B illustrates a conventional configuration of a power cable.

FIG. 17A illustrates a conventional method for mounting the display modules, and FIG. 17B illustrate a method for mounting the display modules according to one embodiment of the present disclosure.

Figure 1A:
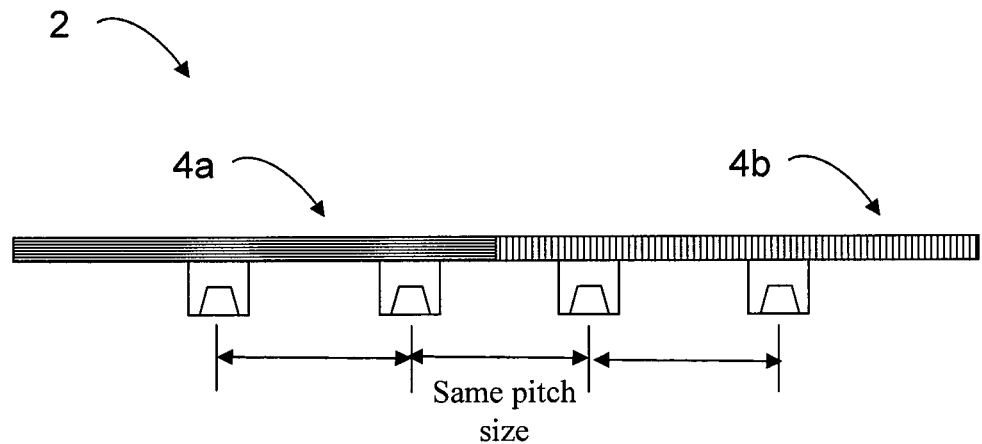
FIG. 1A is a schematic plan view of two prior art display modules coupled together.
Figure 1B:
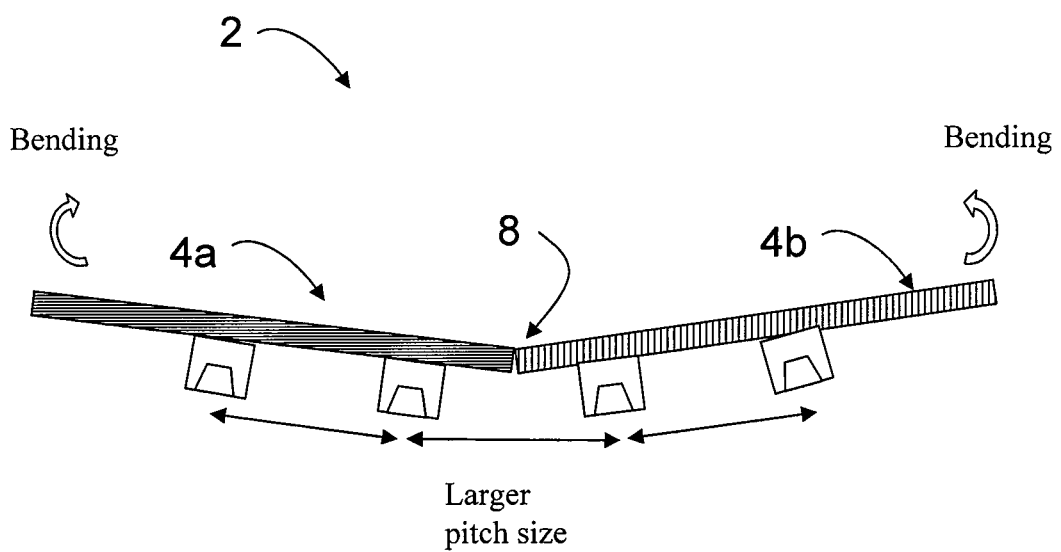
FIG. 1B is a schematic plan view showing the prior art display modules of FIG. 1A under bending.

Those skilled in the art would appreciate that elements in the drawings are illustrated for simplicity and clarity and have not necessarily been drawn to scale. For example, the relative dimensions of some of the elements in the drawings may be distorted to help improve understanding of embodiments of the present disclosure.

DETAILED DESCRIPTION

In this specification, adjectives such as first and second, left and right, and the like may be used solely to distinguish one element or action from another element or action without necessarily requiring or implying any actual such relationship or order. The terms "comprises", "comprising" or similar terms are intended to mean a non-exclusive inclusion, such that a method, system or apparatus that comprises a list of elements does not include those elements solely, but may well include other elements not listed.

Figure 2:
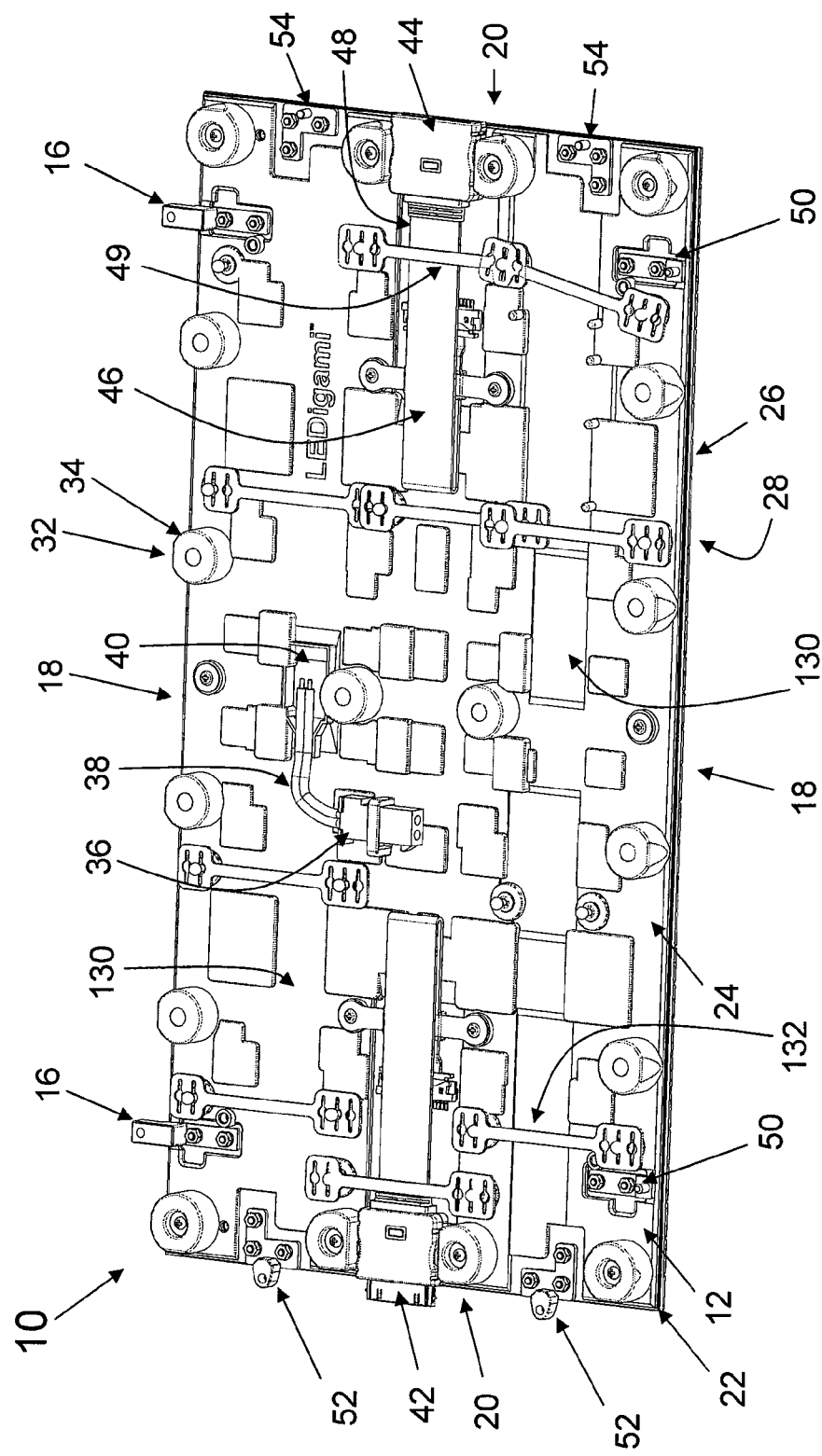
FIG. 2 is a perspective rear view of an exemplary light emitting diode (LED) display module.
Figure 10:
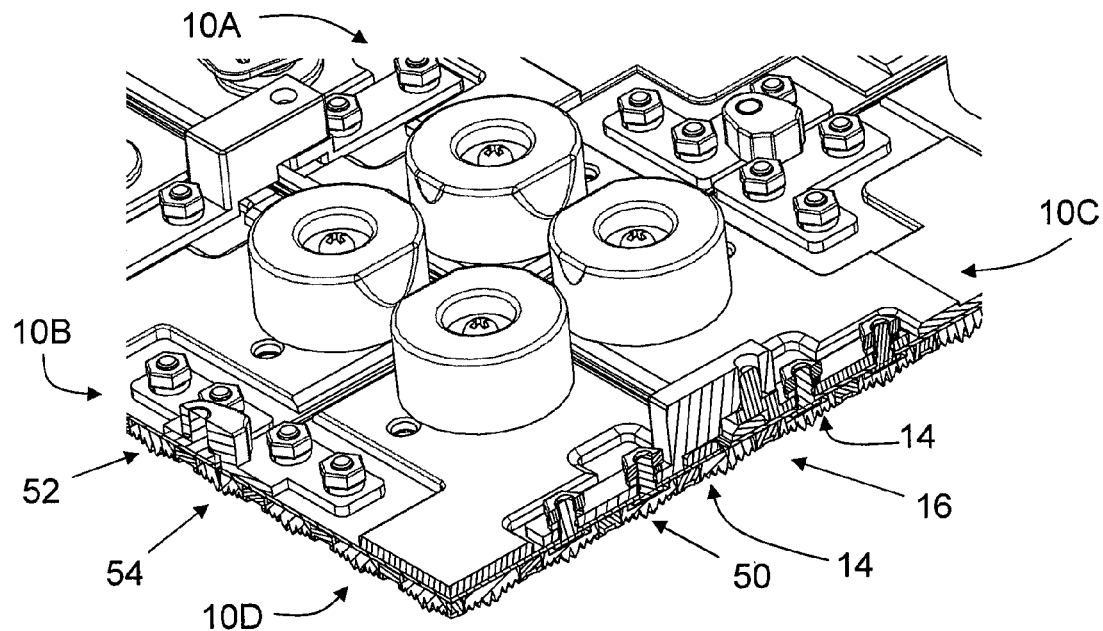
FIG. 10 is an enlarged perspective sectional view of the center of the screen shown in FIG. 9.

Referring to FIG. 2, a light emitting diode (LED) display module 10 provided in accordance with embodiments of the present disclosure comprises a flexible substrate 12 in the form of a printed circuit board (PCB) for supporting a plurality of LEDs 14 (see also, FIG. 10). The LEDs can be, for example, but not limited to, conventional semiconductor LEDs, organic LEDs (OLEDs) or polymer LEDs (PLEDs). A set of connectors 16, 50, 52, 54 are coupled to the flexible substrate 12 for connecting the display module 10 to respective connectors of an adjacent display module (not shown in FIG. 2) along at least one first edge 18 of the display module 10. The set of connectors comprises at least one male connector and at least one female connector.

As will be described in more detail hereinafter, two or more display modules 10 can be connected together along the longer first edge 18 and/or along the shorter second edge 20 to form a flexible display screen of the desired size and shape for any application.

Figure 4:
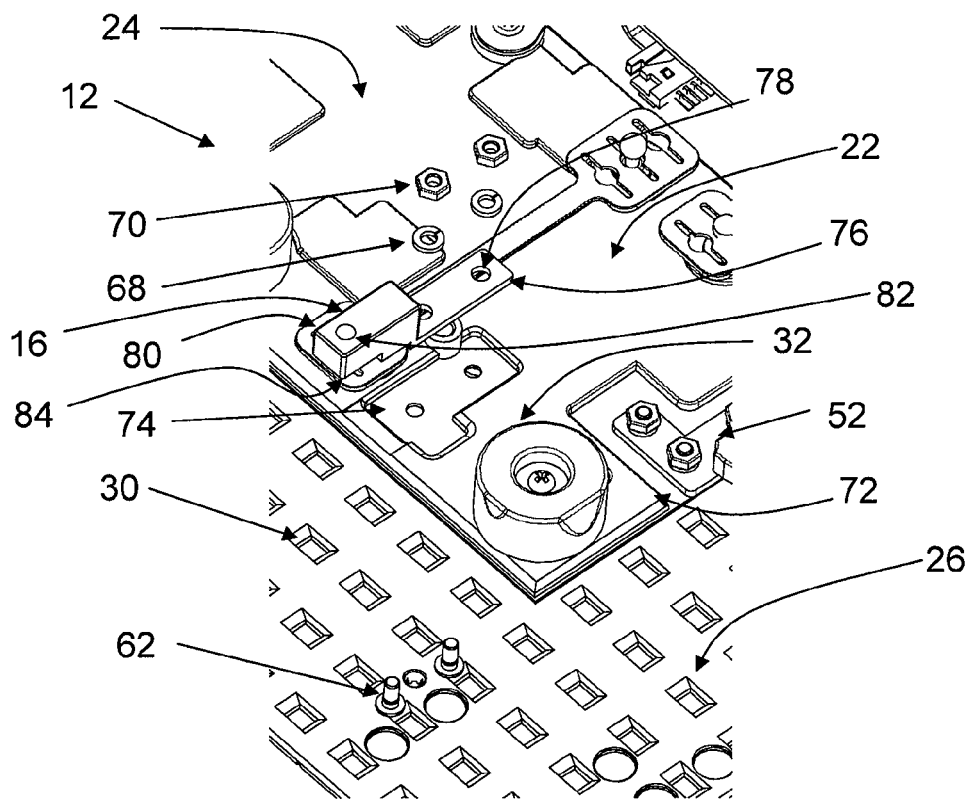
FIG. 4 is an enlarged, partially exploded view of a first corner of the display module shown in FIG. 2.

The display module 10 comprises a flexible housing plate 22 mounted to a first side 24 of the flexible substrate 12 and a flexible cover 26 mounted to a second side 28 of the flexible substrate 12 (shown more clearly in FIG. 2). The flexible cover 26 comprises an array or matrix of apertures 30 (as shown in FIG. 4), which allow passage therethrough of light emitted by the LEDs 14. The cover 26 reflects ambient light and improves the contrast ratio of the display modules. The housing plate 22 and the cover 26 can be made of plastic material to provide the flexible and inflammable characteristics of the display module 10. Thermoplastic urethanes (TPU) are one class of material that is suitable. However, it is envisaged that other materials can be employed for the housing plate 22 and/or the cover 26.

According to some embodiments, at least one magnet 32 can be coupled to the flexible housing plate 22 for attaching the display module 10 to a magnetic surface. As shown in FIG. 2, a plurality of magnets 32 can be coupled to a perimeter of the flexible housing plate 22, for example, via fasteners, such as screws. Magnets 32 can comprise a protective outer coating 34 to improve their durability, particularly for outdoor applications.

A power connector 36 is coupled to the flexible substrate 12 via a wire 38 passing through an aperture 40 in the flexible housing plate 22. Power connector 36 enables power to be supplied to the LED display module 10 and allows adjacent display modules 10 forming the display screen to be coupled together and power to be provided thereto. Channel 130 in housing plate 22 accommodates respective DC power cables 128 (see, FIG. 9), which are held in place with cable restraints 132 adjustably coupled to the housing plate 22.

Figure 9:
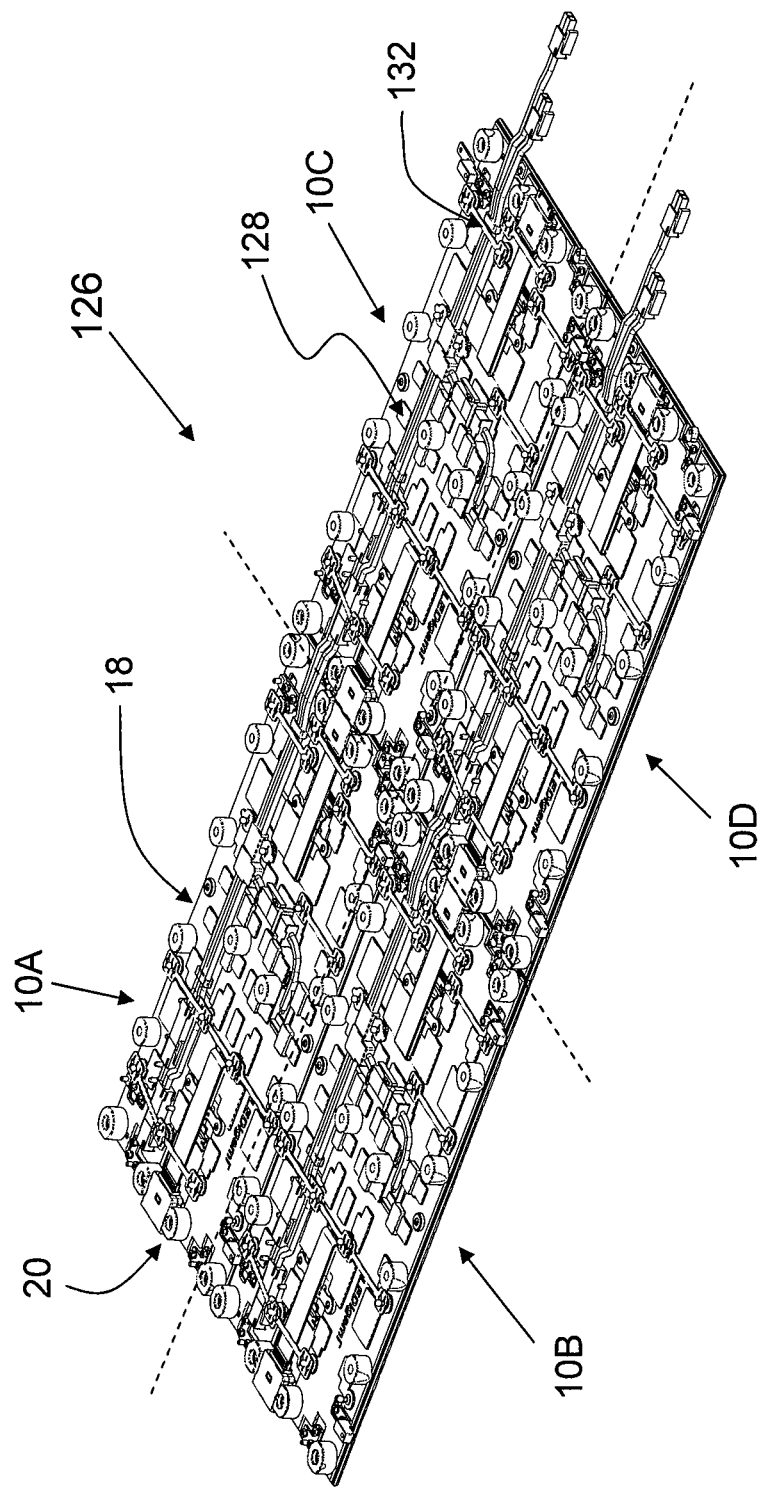
FIG. 9 is a perspective view of the rear of four of the display modules shown in FIG. 2 coupled together forming a display screen.
Figure 12:
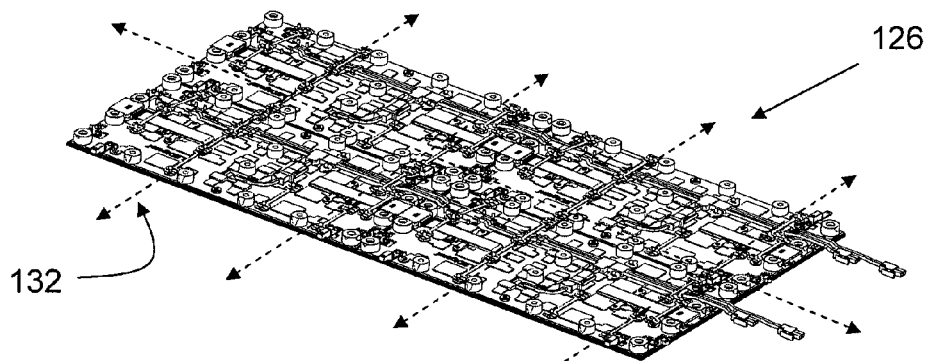
FIG. 12 schematically illustrates exemplary strengthening members to prevent over bending of the display screen.

Here, it is desirable, as shown in FIGS. 9, 12 and 16A, that at least the DC power cables 128 are disposed horizontally so that the DC power cables are connected to the DC power cables of the adjacent display module and the height of the DC power cables are not higher than any other components, in particular the magnet 32. In other words, the DC power cables are disposed so that when the display modules 10 are mounted on the wall, the DC power cables do not disturb the mounting. By the similar reasons, the components, structures or elements other than the magnets should preferably be disposed so that the heights are lower than the heights of the magnets 32. In the present disclosure, the cables are not connected in a direction perpendicular to the surface of the flexible substrate.

Display module 10 also comprises a data plug 42 and a data socket 44 coupled to the flexible substrate 10 via ribbons 46 (i.e., data cable) passing through apertures 48 in the flexible housing plate 22. Data plug 42, data socket 44 and ribbons 46 communicate data signals to and from flexible substrate 10 in the form of a PCB and enable data to be communicated between adjacent display modules 10 coupled together. Ribbons 46 are held in place by one or more cable restraints 49 adjustably coupled to the flexible housing plate 22.

Here, it is desirable, as shown in FIGS. 9, 12 and 16A, that the data cables 44, 46 are disposed horizontally so that the data cables are connected to the data cables of the adjacent display module and the height of the data cables are not higher than any other components, in particular the magnet 32. In other words, the data cables are disposed so that when the display modules 10 are mounted on the wall, the data cables do not disturb the mounting. In the present disclosure, the cables are not connected in a direction perpendicular to the surface of the flexible substrate.

Figure 5:
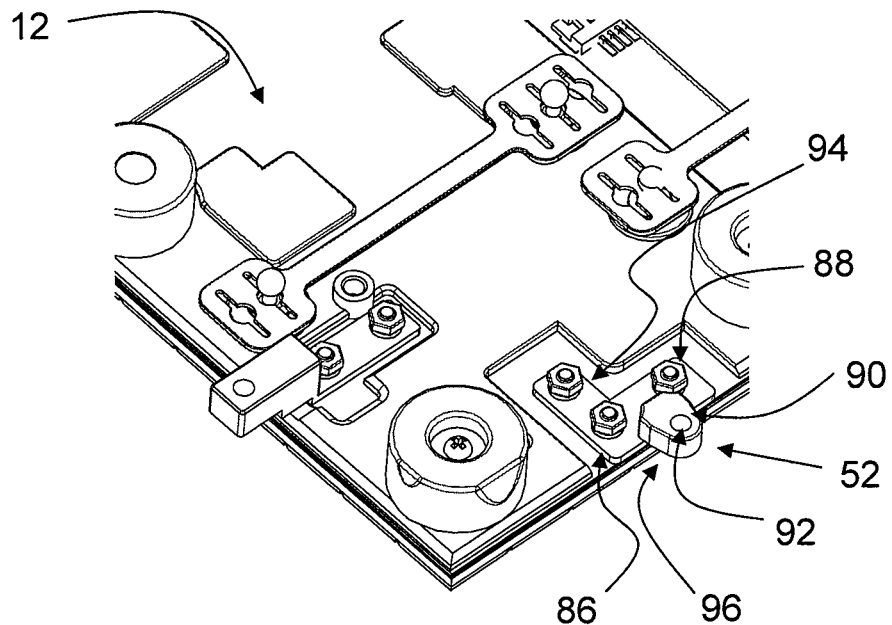
FIG. 5 is a perspective view of the assembled first corner of the display module shown in FIG. 4.

According to the embodiment shown in FIG. 2, display module 10 comprises two spaced apart female connectors 16 coupled to the flexible substrate 12 adjacent one of the longer first edges 18 for connecting the display module 10 to at least two respective male connectors of an adjacent display module along the longer first edge 18 (see also, FIG. 5).

Figure 7:
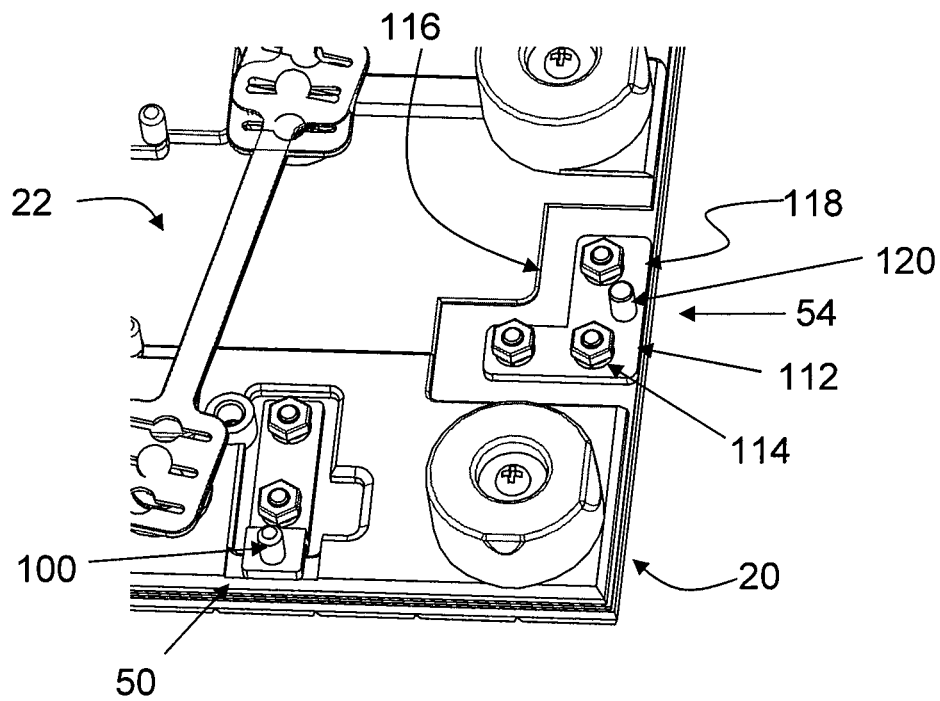
FIG. 7 is a perspective view of an exemplary third assembled corner of the display module shown in FIG. 2.

Display module 10 also comprises two spaced apart male connectors 50 coupled to the flexible substrate 12 adjacent the opposite longer first edge 18 for connecting the display module 10 to at least two respective female connectors of another adjacent display module along the opposite longer first edge 18 (see also, FIG. 7).

Display module 10 further comprises two spaced apart female connectors 52 coupled to the flexible substrate 12 adjacent one of the shorter second edges 20 for connecting the display module 10 to at least two respective male connectors of a further adjacent display module along the shorter second edge 20 (see also, FIG. 5).

Display module 10 also comprises two spaced apart male connectors 54 coupled to the flexible substrate 12 adjacent the opposite shorter second edge 20 for connecting the display module 10 to at least two respective female connectors of another adjacent display module along the opposite shorter second edge 20 (see also, FIG. 7).

It is noted that the female connectors 16 and 52 may have the same structure or have different structures. Similarly, the male connectors 50 and 54 may have the same structure or have different structures.

Flexible housing plate 22 comprises suitably located, sized and shaped apertures or cut-outs to enable the connectors 16, 50, 52, 54 to be coupled to the flexible substrate 12 beneath the housing plate 22.

Figure 3:
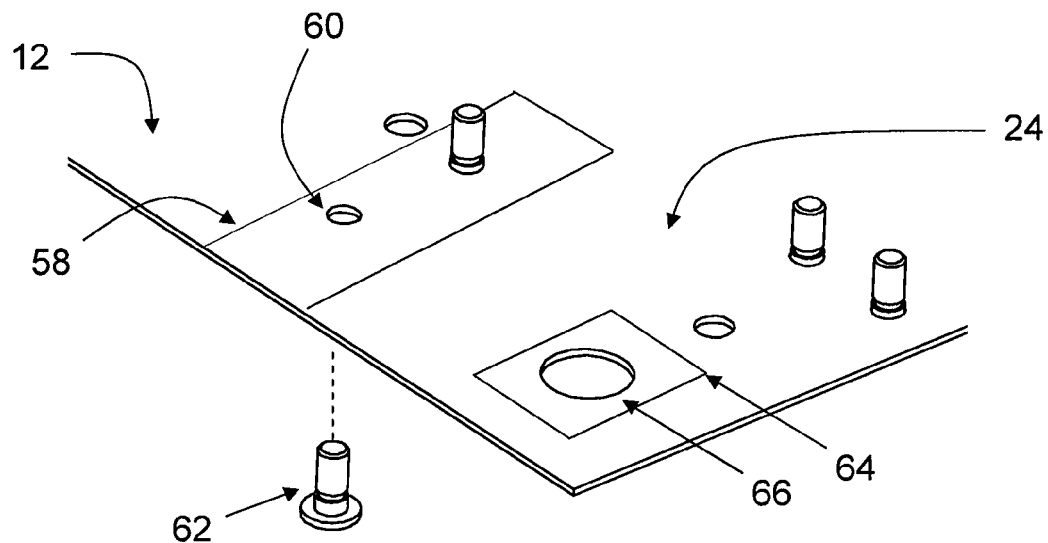
FIG. 3 is a perspective view of a corner of an exemplary flexible substrate of the display module shown in FIG. 2.

With reference to FIG. 3, the flexible substrate 12 in the form of the PCB comprises a plurality of reference marks with which the connectors are aligned to ensure the correct positioning of the connectors on the PCB and therefore accurate horizontal and vertical alignment of adjacent display modules 10 when connected together. Reference marks include lines 58 on the PCB demarcating a footprint of the connectors and apertures 60 through the PCB for accurately locating fasteners on the PCB. For example, FIG. 3 shows apertures 60 for receiving a fastener in the form of a brass screw 62 therethrough, which is soldered in position on the PCB 12. FIG. 3 also shows other brass screws soldered in position ready to be fastened to respective connectors. Reference marks enable accurate positioning of the connectors on the flexible substrate for horizontal and vertical alignment of adjacent display modules to a tolerance of ±3% of an LED pitch size of the display modules. For example, if the LED pitch size is 10 mm, the tolerance will be ±0.3 mm. In some embodiments, the tolerance can be as good as ≤0.1 mm.

According to some embodiments, reference marks can also be used for the accurate positioning of other components of the display module 10 including electronic components, such as LEDs, capacitors etc., and structural components, such as magnets 32. FIG. 3 shows reference lines 64 and aperture 66 for accurately positioning magnet 32.

The partially exploded view in FIG. 4 shows flexible housing plate 22 mounted to the first side 24 of flexible substrate 12. Flexible cover 26 comprising the array of apertures 30 is beneath and separated from the second side 28 of the flexible substrate 12. Magnets 32 are mounted to housing plate 22 and female connector 52 is coupled to the flexible substrate 12 by pre-positioned fasteners in the form of brass screws 62, spring washers 68 and nuts 70. Cut-out 72 in housing plate 22 allows connector 52 to be coupled to the flexible substrate 12. Aperture 74 in housing plate 22 reveals the flexible substrate 12 beneath and reference marks in the form of apertures 60 for receiving brass screws 62. Female connector 16 is coupled to flexible substrate 12 by brass screws 62, spring washers 68 and nuts 70.

Female connector 16 shown in FIG. 4 comprises an elongated base 76 having apertures 78 for receiving fasteners 62 to couple connector 16 to substrate 12. A head or flange 80 extends from base 76 and comprises an aperture 82 for receiving a projection of a respective aligned male connector of an adjacent display module. With additional reference to FIG. 4, head 80 comprises a stepped underside 84 such that head 80 transcends housing plate 22 and protrudes beyond the first edge 18 of the display module 12. Head 80 has a greater thickness than base 76 to accommodate aperture 82 and provides a strong and secure connection with a respective aligned male connector of an adjacent display module.

Referring to FIG. 5, which illustrates another example of female connector, female connector 52 comprises an L-shaped base 86 having apertures 88 for receiving fasteners 62 to couple connector 52 to substrate 12. A head or flange 90 extends from base 86 and comprises an aperture 92 for receiving a projection of a respective aligned male connector of an adjacent display module. Head 90 has a greater thickness than base 86 to accommodate aperture 92 and provides a strong and secure connection with the respective aligned male connector of an adjacent display module. Head 90 protrudes beyond the second edge 20 of the display module 12. However, cut-out 72 in housing plate 22 enables an arm 94 of the L-shaped base 86 to be located substantially adjacent second edge 20 and head 90 does not need to transcend housing plate 22. Therefore, head 90 does not require a stepped underside and comprises a planar underside 96.

Figure 6:
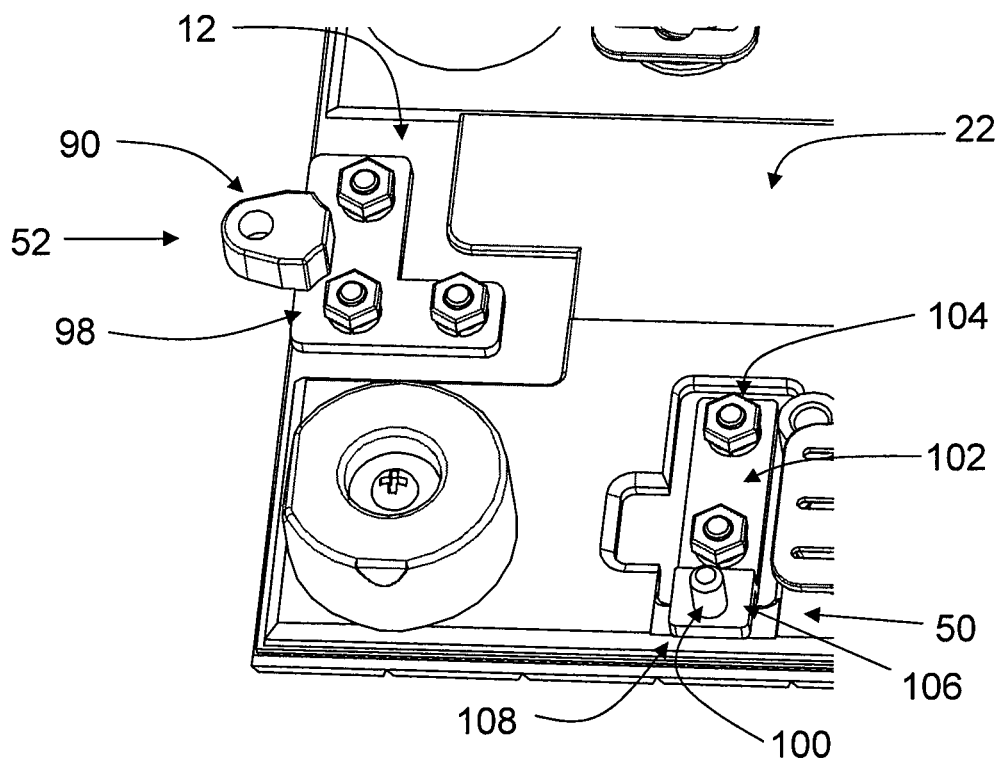
FIG. 6 is a perspective view of an exemplary second assembled corner of the display module shown in FIG. 2.

FIG. 6 shows another corner of the rear of the display module 10, which comprises a mirror image of female connector 52 such that head 90 extends from the other arm 98 of the L-shaped base 86. FIG. 6 also shows a male connector 50 coupled to the flexible substrate 12, the connector 50 having a projection 100 for insertion into an aperture of a respective aligned female connector of an adjacent display module. Connector 50 comprises an elongated base 102 having apertures 104 for receiving therethrough fasteners 62 to couple connector 50 to substrate 12. A head 106 extends from the base 102 and comprises a stepped underside 108 such that the underside 108 rests on housing plate 22. Projection 100 extends substantially perpendicularly from head 106 and projection 100 is shaped such that it can be removably received within, for example, aperture 82 of female connector 16 of an adjacent display module. Housing plate 22 comprises aperture 110 to enable connector 50 to be coupled to substrate 12. In this embodiment, male connector 50 does not protrude beyond the edge 20 of the display module 10.

Referring to FIG. 7, a third corner of the display module 10 comprises another male connector 50 as described above. This corner of the display module 10 also comprises male connector 54, which has an L-shaped base 112 having apertures 114 for receiving fasteners 62 therethrough to couple connector 54 to substrate 12. L-shaped cut-out 116 in housing plate 22 enables connector 54 to be coupled to the substrate 12 and an arm 118 of the L-shaped base 112 is located substantially adjacent second edge 20. Projection 120 extends substantially perpendicularly from base 112 and projection 120 is shaped such that it can be removably received within, for example, aperture 92 of female connector 52 of an adjacent display module. In this embodiment, connector 54 does not protrude beyond the edge 20 of the display module 10.

Figure 8:
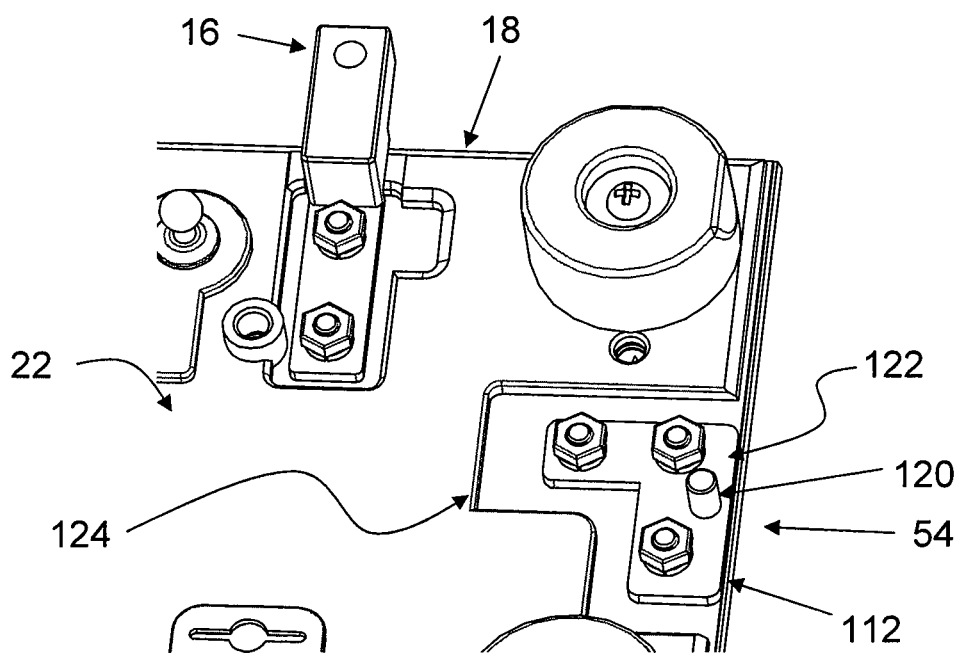
FIG. 8 is a perspective view of an exemplary fourth assembled corner of the display module shown in FIG. 2.

Referring to FIG. 8, a fourth corner of the display module 10 comprises a mirror image of male connector 54 described above such that projection 120 extends from the other arm 122 of the L-shaped base 112. L-shaped cut-out 124 in housing plate 22 is also a mirror image of L-shaped cut-out 116. The fourth corner of the display module 10 also comprises another female connector 16 as described above, which protrudes beyond the first longer edge 18 of the display module 10 such that both spaced apart female connectors 16 overlap with an adjacent display module.

In this embodiment, spaced apart female connectors 52 protrude beyond the second shorter edge 20 of the display module 10 such that both female connectors 52 overlap with male connectors of adjacent display module. Spaced apart male connectors 50 adjacent second longer edge 18 and spaced apart male connectors 54 adjacent second shorter edge 20 do not protrude beyond edges 18, 20 respectively of the display module 10. However, in alternative embodiments one or more male connectors can protrude beyond one or more edges of the display module 10 and one or more of the female connectors may not protrude beyond edges of the display module 10.

It will also be noted that in this embodiment, male connectors 50, 54 having the projections 100, 120 are coupled to the flexible substrate 12 adjacent edges 18, 20 respectively opposite edges 18, 20 of the display module 10 having female connectors 16, 52 comprising apertures 82, 92.

However, it should be appreciated that in other embodiments the locations of at least some of the connectors 16, 50, 52, 54 can be changed. For example, the locations of either or both female connectors 16 can be swapped with the locations of either or both male connectors 50 since both types of connectors 16, 50 have elongated bases 76, 102 and stepped undersides 84, 108. Similarly, the locations of either or both female connectors 52 can be swapped with the locations of either or both male connectors 54 since both types of connectors 52, 54 have L-shaped bases 86, 112 and are located adjacent the respective shorter edges 20 of the display module 10. Such swapping of connectors would yield a more complicated connection configuration and such swapping would need to be uniform across all display modules 10 to ensure the connectivity of all modules.

In the embodiment shown, two connectors are provided at each edge 18, 20 of the display module 10. The set of connectors comprises at least one connector at each edge 18, 20 of the display module 10 to enable attachment of another display module to any side of the display module. It will be appreciated that more than two connectors could be provided at each edge of the display module 10.

It should also be appreciated that other shapes of display module are envisaged other than rectangular and with a number of sides other than four. However, it will be appreciated that the shape of the display module should be such that the display modules will tessellate leaving no spaces between the display modules. Hence, other possible shapes of display module include, but are not limited to, triangles, trapezoids, diamonds, other quadrilaterals, hexagons.

Referring to FIG. 9, four of the display modules 10 are shown coupled together to form a flexible LED display screen 126. The rear of the modules is shown and the dotted lines demarcate the four display modules 10A, 10B, 10C, 10D. Each display module is coupled to an adjacent display module along one first edge 18 and along one second edge 20 of the display module. Female connectors 16 of display module 10A couple to male connectors 50 of display module 10B. Female connectors 52 of display module 10A also couple to male connectors 54 of display module 10C. Female connectors 52 of display module 10B couple to male connectors 54 of display module 10D and female connectors 16 of display module 10C couple to male connectors 50 of display module 10D. Data plugs 42 of display modules 10C and 10D are respectively coupled to data sockets 44 of display modules 10A and 10B.

Power connectors 36 of each display module are coupled to respective DC power cables 128, which are accommodated within channels 130 in housing plate 22 and held in place with cable restraints 132 adjustably coupled to the housing plate 22. It is noted that, as shown in FIGS. 9, 12, 16A and 16C, that at least the DC power cables 128 are disposed horizontally so that the DC power cables are connected to the DC power cables of the adjacent display module and the height of the DC power cables are not higher than any other components, in particular the magnet 32. In other words, the DC power cables are disposed so that when the display modules 10 are mounted on the wall, the DC power cables do not disturb the mounting. Conventionally, as shown in FIG. 16B, DC power cables 128 were connected to power connector 36A from the vertical direction. In such a case, the mounting surface on which the display module is mounted must have holes for the cables, which would require an intermediate board having holes to mount the display modules (see, FIG. 17A). In contrast, when the DC power cables 128 are disposed horizontally, the LED display modules can be mounted freely on any location on the surface by the magnets 32, even on a curved surface (see, FIG. 17B).

Figure 18A:
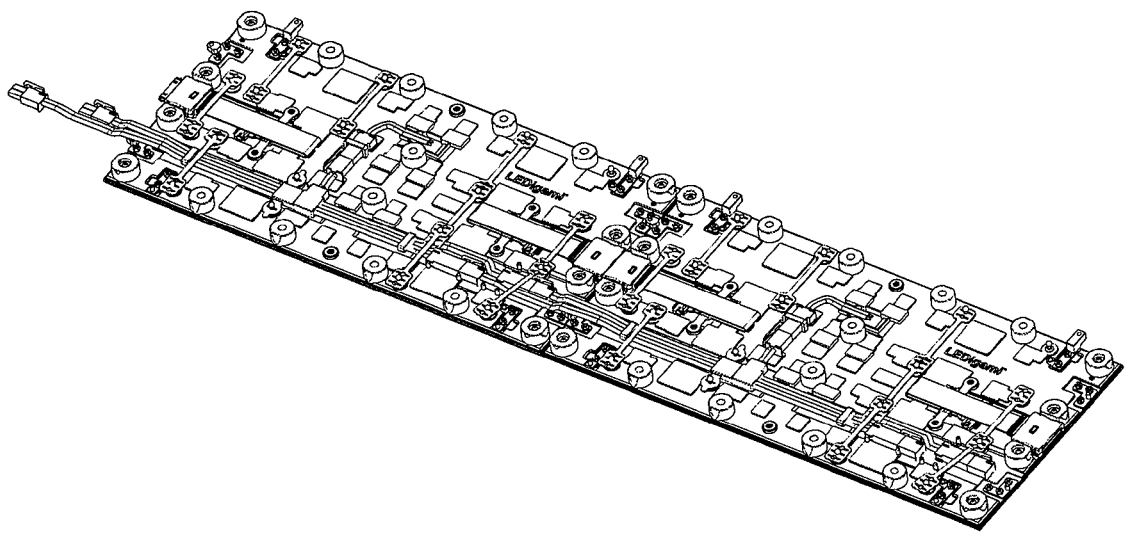
FIGS. 18A and 18B illustrate an example of the configuration of power cables and data cables according to one embodiment of the present disclosure.
Figure 18B:
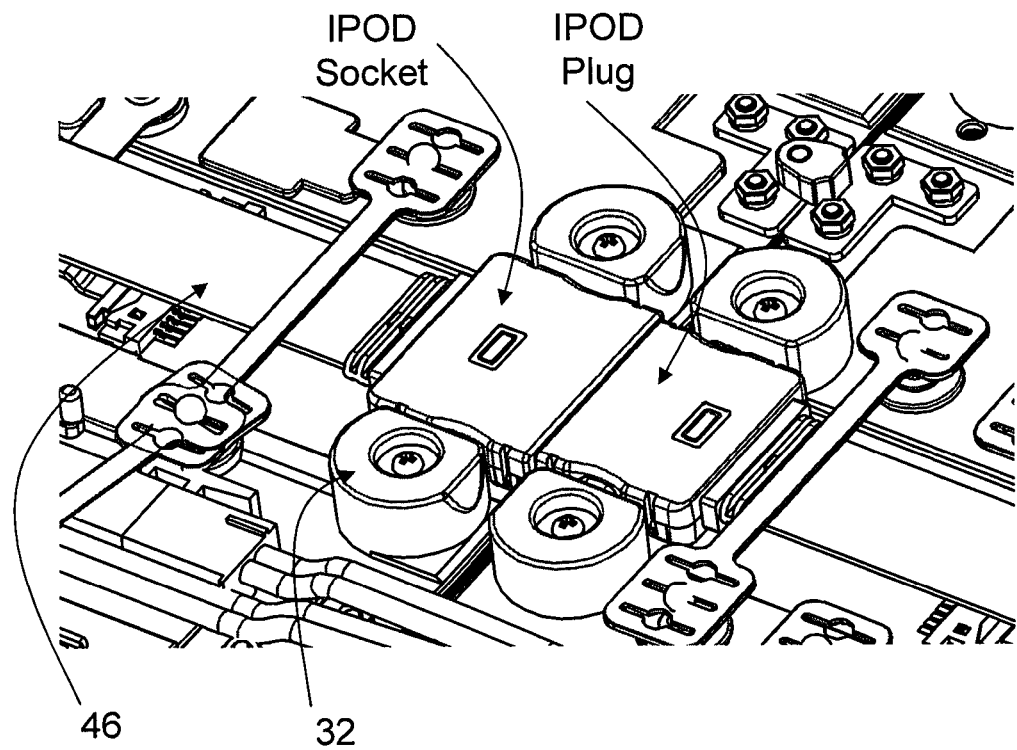

By the similar reasons, it is desirable that the components, structures or elements other than the magnets (e.g., the data ribbons 46) are disposed so that the heights are lower than the heights of the magnets 32 as shown in FIG. 16C. For example, as shown in FIG. 18A and 18B, the height of connectors of data ribbons 46 are configured to be lower than the height of the magnet 32. Also, as shown in FIG. 16C, the channel (i.e., the space between the magnets 32) for the power cable and the channel for the data cable are preferably separate in the display module. Further, the difference between the height of the magnet 32 and the connector for the cable is preferably less than 5 mm.

FIG. 10 illustrates the secure, accurate coupling of adjacent display modules 10 via connectors 16, 50, 52 and 54, which maintain accurate vertical and horizontal alignment of the LED modules to ±3% of an LED pitch size of the display modules, particularly during flexing of the display screen 126, for example, when the display screen is being mounted on a curved surface or when the screen is curved to form a shape, such as a cylinder. FIG. 10 illustrates how female connectors 16 of display modules 10A and 10C overlap with adjacent display modules 10B and 10D respectively such that projections 100 of male connectors 50 are received within apertures 82 of female connectors 16. Female connectors 52 of display modules 10A and 10B also overlap with adjacent display modules 10C and 10D respectively, although to a lesser extent, such that projections 120 of male connectors 54 are received within apertures 92 of female connectors 52. FIG. 10 also illustrates LEDs 14 not visible in preceding figures relating to the present disclosure.

Hence, according to another aspect, embodiments of the present disclosure reside in a light emitting diode (LED) display screen 126 comprising a plurality of LED display modules 10A, 10B, 10C, 10D, each display module comprising a flexible substrate 12 supporting a plurality of LEDs and a set of connectors 16, 50, 52, 54 coupled to the flexible substrate 12 for connecting the display modules to respective connectors 50, 16, 54, 52, of adjacent display modules along at least one edge 18, 20 of the display module 10. Whilst FIG. 10 shows four display modules coupled together to form the display screen 126, it will be appreciated that a display screen could be formed from a single display module 10 or a plurality of display modules according to the size and shape of screen required.

Figure 11:
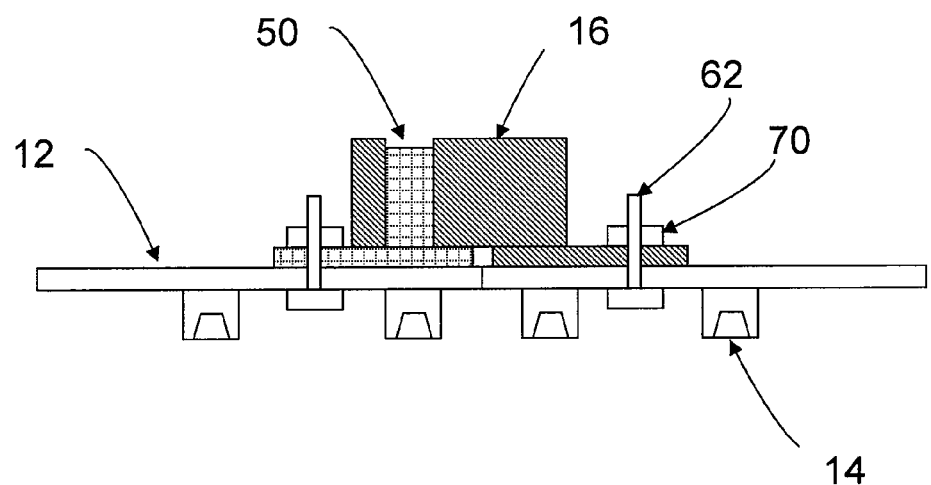
FIG. 11 is a schematic sectional view showing the coupling of male and female connectors.

FIG. 11 further illustrates the coupling of a male connector, e.g. male connector 50, with a female connector, e.g. female connector 16, according to the present disclosure. The male and female connectors can only be mated vertically and not at an angle which ensures the accurate alignment of adjacent display modules. The arrangement of the connectors ensures that the display modules 10 can only be connected together one way, which further ensures the accurate connection of multiples display modules.

Figure 11A:
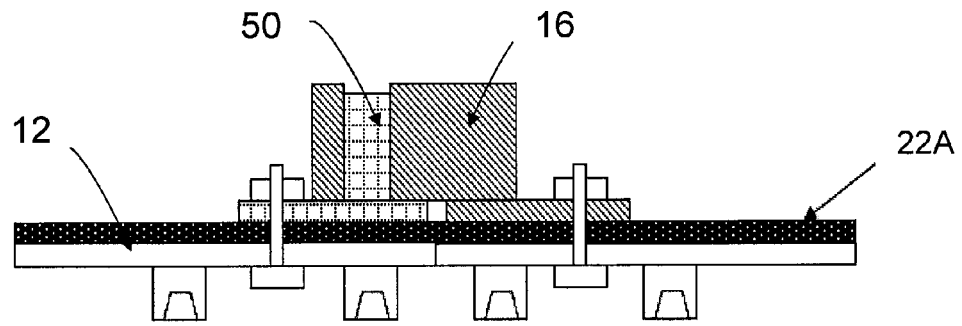
FIG. 11A is a schematic sectional view showing an alternative embodiment in which male and female connectors are coupled to a flexible plastics layer of the display module.

FIG. 11A illustrates another embodiment of the display module 10 wherein a flexible plastic layer 22A is located between the flexible substrate 12 and the connectors. Flexible plastic layer 22A can be made from thermoplastic urethanes (TPU) or other suitable plastic material. According to some embodiments, flexible plastic layer 22A can be provided in addition to flexible housing plate 22. In other embodiments, flexible plastic layer 22A can be a continuation of the housing plate 22, i.e. the connectors are provided on top of and attached to the flexible housing plate 22 rather than being attached to the flexible substrate 12 at cut-outs in the housing plate 22.

With reference to FIG. 12, according to some embodiments, housing plate 22 can comprise one or more elongated strengthening members 132 to limit bending of the display module 10 and display screen 126. Strengthening members 132 prevent over bending of the display module 10, which may damage the flexible substrate 12. Elongated strengthening members 132 can be in the form of steel wires having some elasticity to allow some flexing of the display modules 10. In some embodiments a plurality of elongated strengthening members 132 are provided extending vertically and horizontally across the height and width respectively of the display module 10 in a grid arrangement as shown in FIG. 12. When the elongated strengthening members are used, the accuracy of the LED pitch of ±3% can be achieved within the bending limitation limited by the elongated strengthening members.

Figure 13:
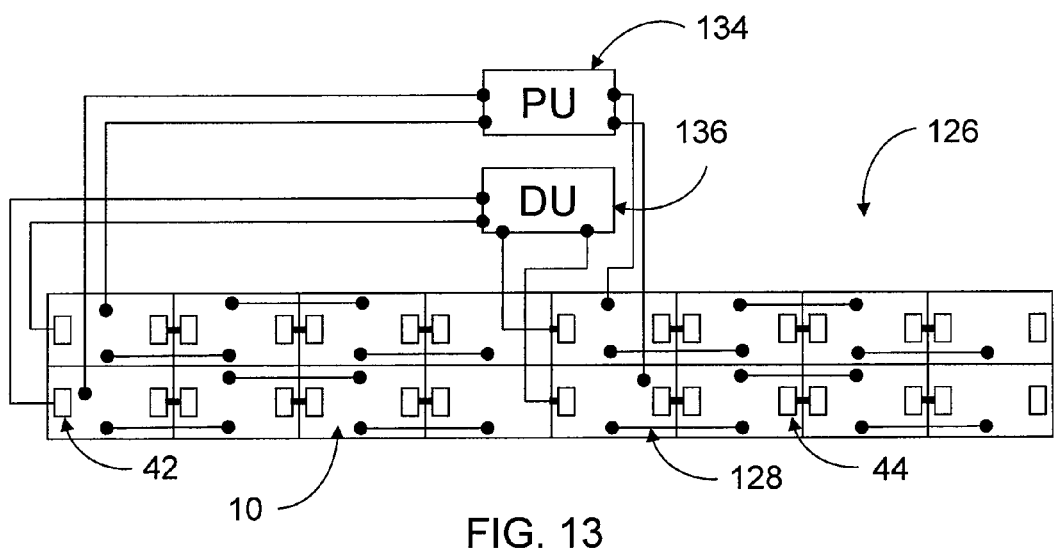
FIG. 13 is a schematic diagram illustrating exemplary data and power connections of a plurality of display modules forming a display screen

FIG. 13 illustrates an example of data and power connections for a plurality of display modules 10 forming a display screen 126. In this example, sixteen display modules 10 are coupled together. Power unit 134 is coupled to the power connector 36 of four display modules and power cables 128 couple adjacent display modules to power the whole display screen. Data unit 136 is coupled to data plugs 42 of four display modules and data plugs 42 are connected to data sockets 44 of adjacent display modules for data transmission to all display modules of the display screen 126.

Figure 14:
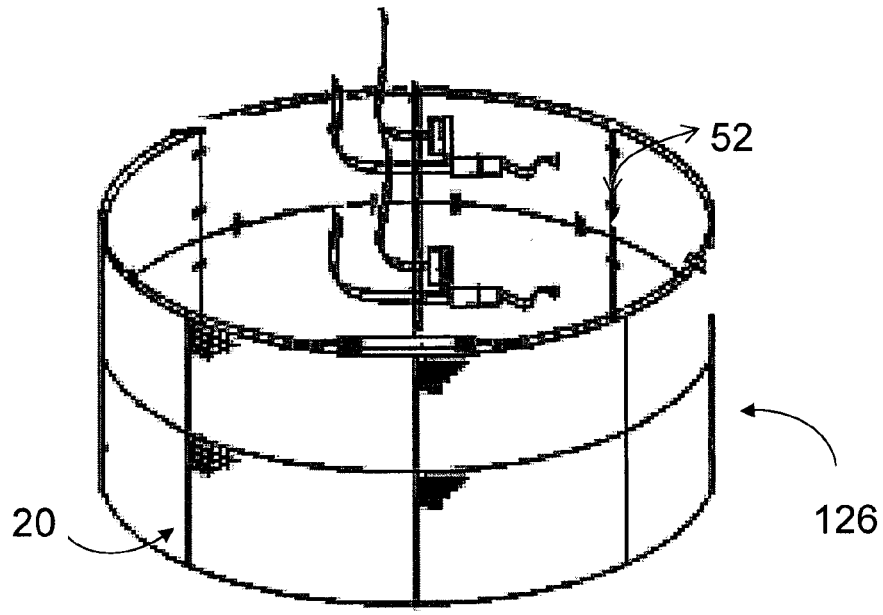
FIG. 14 illustrates the display screen shown in FIG. 12 formed into a cylinder.

FIG. 14 illustrates the display screen shown in FIG. 13 formed into a cylinder such that the shorter sides 20 of the first two display modules and the last two display modules are coupled together. The power and data connections to the rear of two of the display modules and some of the connectors 16, 50, 52, 54 are shown in FIG. 14.

Figure 15:
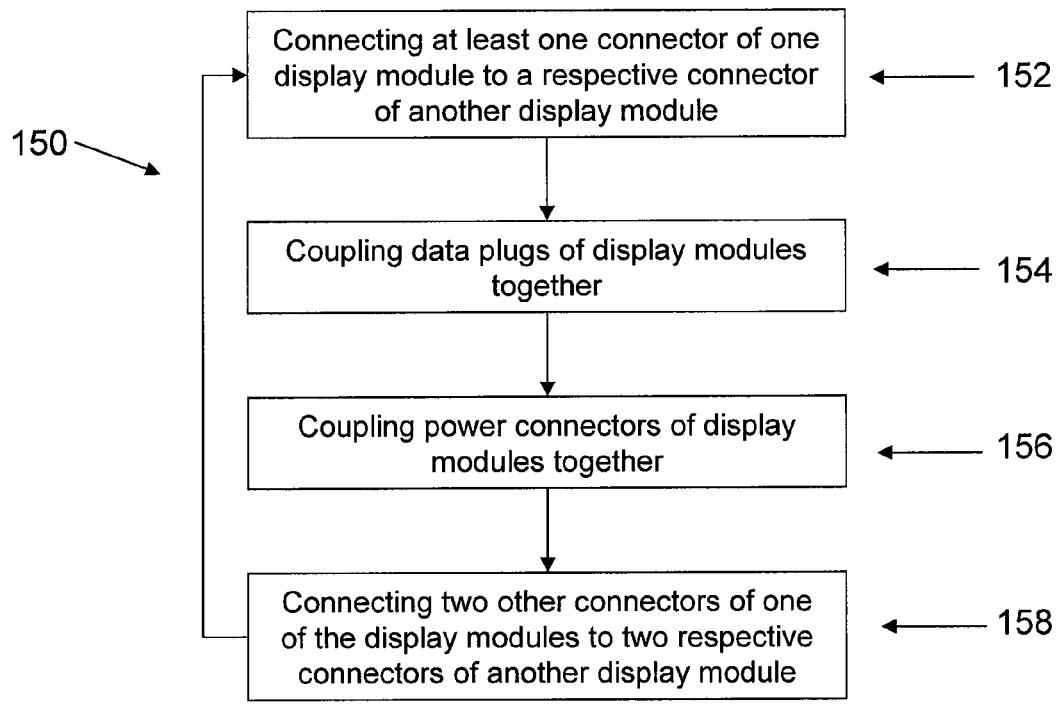
FIG. 15 is a general flow diagram illustrating a method of forming a display screen.

With reference to the general flow diagram in FIG. 15, according to a further aspect of the present disclosure, a method 150 of forming a display screen 126 comprising a plurality of LED display modules 10 is provided, where each display module comprises a flexible substrate 12 supporting a plurality of LEDs 14. The method 150 includes at step 152 connecting at least two connectors, e.g. female connectors 16, coupled to the flexible substrate 12 of one of the display modules to at least two respective connectors, e.g. male connectors 50, of an adjacent display module along at least one first edge 18 of the display module such that horizontal and vertical alignment of the display modules is maintained during flexing of the display screen.

The method 150 can include at step 154 coupling the data plug 42 of one display module 10 to the data socket 44 of the adjacent display module. The method 150 can further include at step 156 coupling the power connector 36 of one display module 10 to the power connector 36 of the adjacent display module.

The method 150 can include at step 158 connecting at least two connectors, e.g. female connectors 52, of one of the display modules, e.g. the first display module, to at least two respective connectors, e.g. male connectors 54, of another adjacent display module. This can be repeated until the desired size and shape of display screen is achieved.

Yet according to another embodiment, the display module 10 has the following specifications: brightness=5000 nits (cd/m$^2$); RGB 3 in 1 SMD LEDs; resolution=32 (W)×16 (V); viewing angle 50% brightness=140 (H/V) (+70/−70); pixel pitch=10 mm; color temperature=6500K; refresh rate>300 Hz; color=RGB 256×256×256; bending radius along long axis<160 mm; magnet height=10 mm; gray scale level=16 bits; brightness level=256; no. modules/m$^2$=19. It will be appreciated that these specifications are exemplary only and do not limit the scope of the present subject matter. The display module 10 is also waterproof and can therefore be used for both indoor and outdoor applications.

Figure 19:
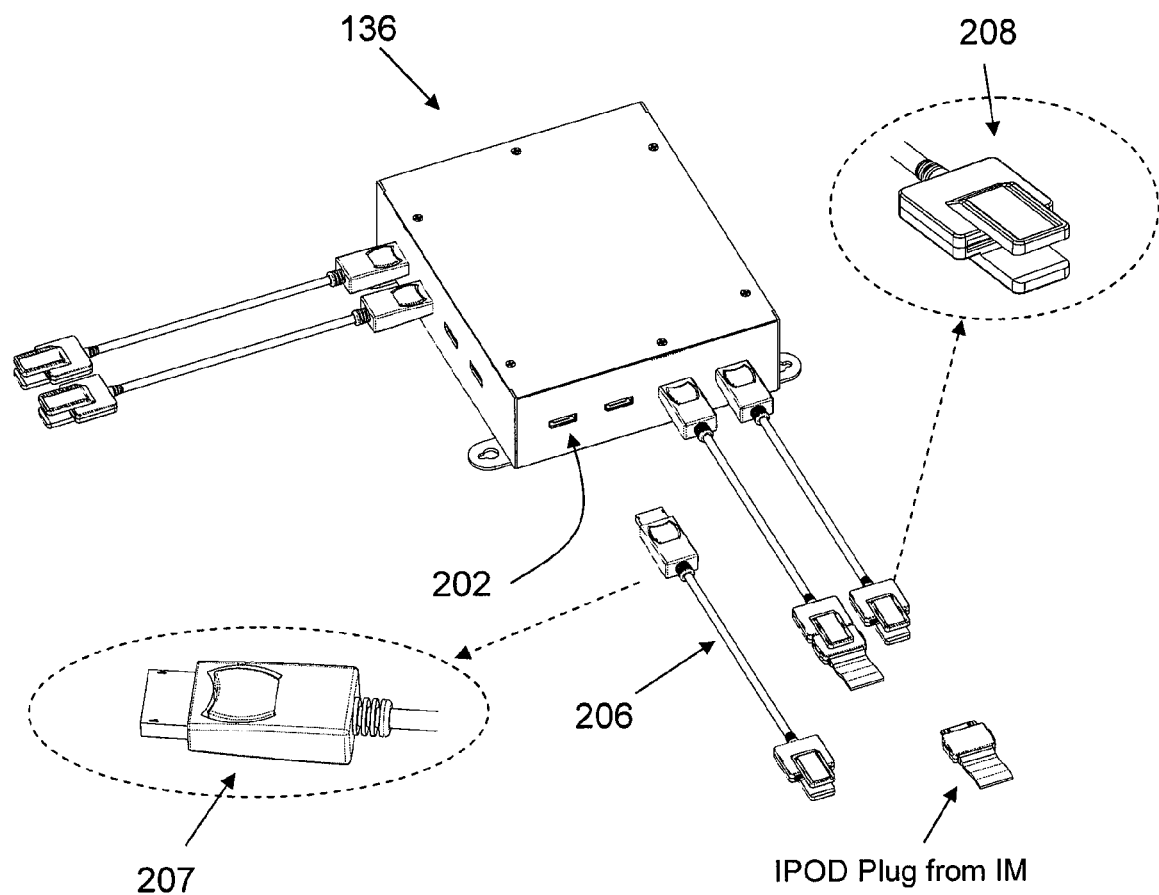
FIG. 19 illustrates an example of a data unit.
Figure 20A:
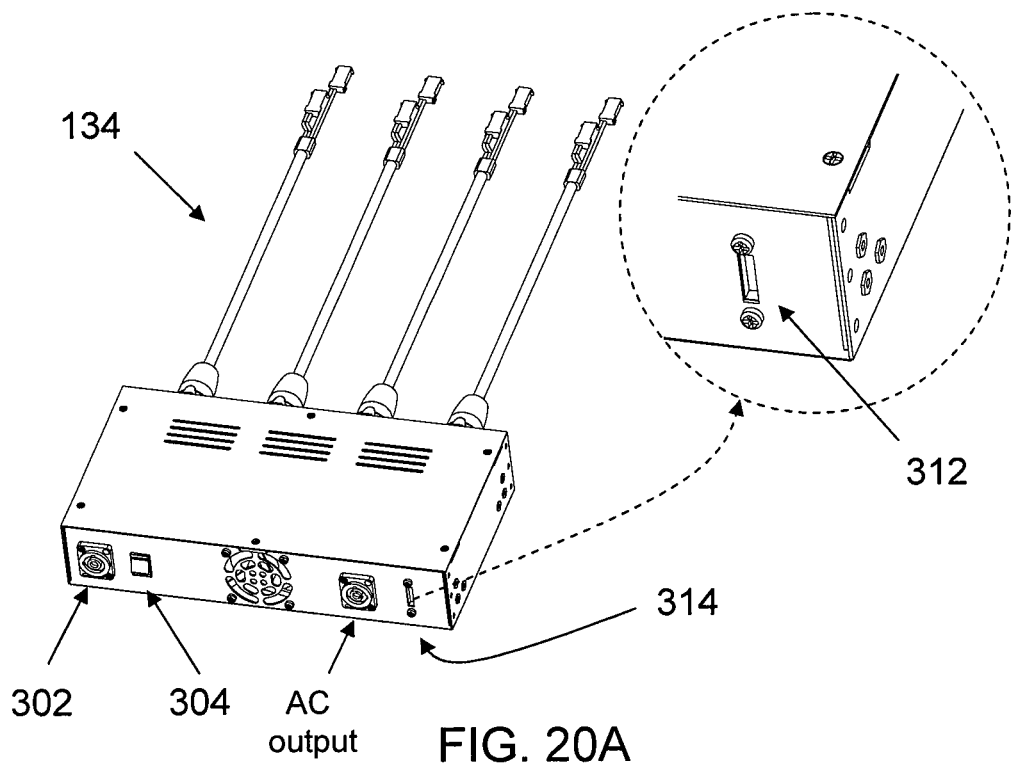
FIGS. 20A and 20B illustrate an example of a power unit.
Figure 20B:
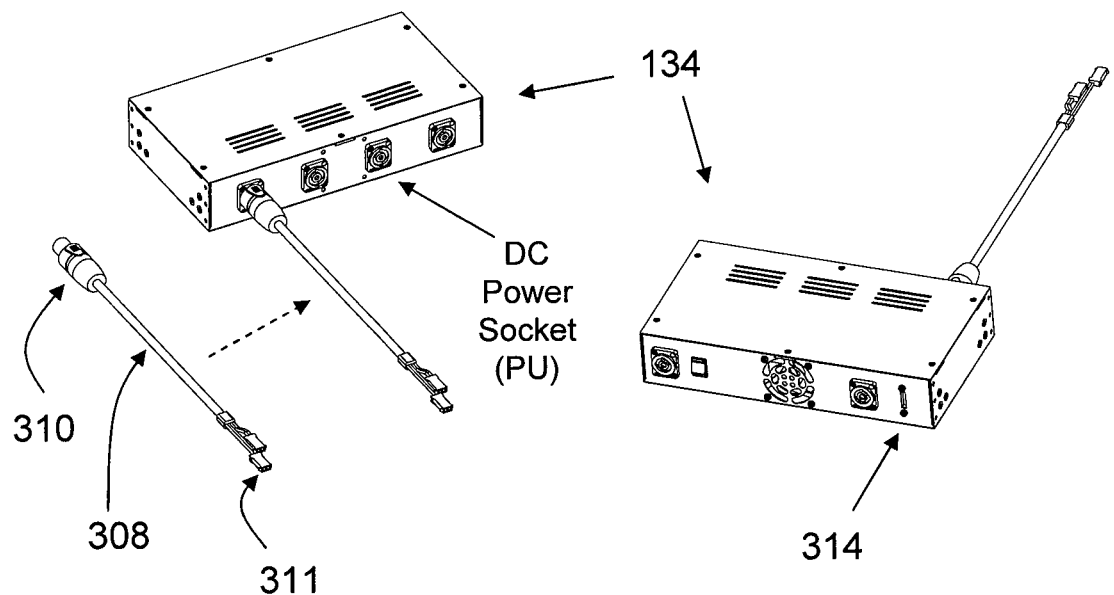

The display system according to the present disclosure may include data unit (DU) 136 as shown in FIG. 19, and power unit (PU) 134 as shown in FIG. 20A and 20B. The data unit 136 has a plurality of display port socket 202, each of which includes a latch connector. The data cable (i.e., ribbons 46) are connected in the multiple display modules 10 and eventually connected to the data unit 136 via an IM data cable 206. One end of the IM data cable 206 has a latch connector 207 to be connected to the data unit 136, and the other end of the IM data cable 206 has an IPOD socket 208 with security protect for connecting the data socket 42 or data plug 44 of the data ribbons of the display modules.

The power unit 134 has an AC input 302, power switch 304 and a plurality of DC power sockets 306. The DC power cables 128 of the display module 10 are connected to the power unit 134 via IM power cables 308. The IM power cable 308 has a DC power plug 310 at one end to be connected to the power unit 134 and a DC power socket 311 to be connected to the power cable 128 of the display module. The power unit may also include a serial ATA (SATA) connector 312 together with a 5V output terminal 314 for the data unit 136.

Hence, the aspects of the present disclosure as described herein address or at least ameliorate the aforementioned problems associated with known LED display modules and display screens formed therefrom. Female connectors 16, 50 and male connectors 52, 54 are accurately located on flexible substrate 12 and enable accurate coupling of adjacent display modules 10. Accurate vertical and horizontal alignment of the LED display modules 10 is maintained to ±3% of an LED pitch size of the display modules, particularly during flexing of the display modules and the display screen 126 formed therefrom. Misalignment of display modules during flexing is therefore prevented or at least very much ameliorated. The LED pitch size is also maintained between adjacent modules particularly during flexing and hence the image quality of the display screens is preserved. Another advantage is that access to the rear of the display modules is straightforward, for example for maintenance purposes. The power and data cables are neatly routed through the flexible housing plate 22 at the rear of the display module 10, for example through channels 130, creating an uncluttered environment, thus simplifying maintenance and trouble-shooting. No cabling is visible from the front of the display module and no gap occurs between adjacent display modules during flexing, thus creating an aesthetically pleasing display module and display screen. Cover 26 reflects ambient light and improves the contrast ratio, which can often be problematic with conventional LED display screens particularly in outdoor applications. Furthermore, the display modules are waterproof enabling use in outdoor applications as well as indoor applications.

Throughout the specification the aim has been to describe the subject matter of the present disclosure without limiting the subject matter to any one embodiment or specific collection of features. Persons skilled in the relevant art may realize variations from the specific embodiments that will nonetheless fall within the scope of the disclosure.

We claim:

1. A light emitting diode (LED) display module, comprising:
 a flexible substrate having a first surface and a second surface which is opposite to the first surface and on which a plurality of LEDs are disposed;
 a power cable including a socket or a plug, for providing power to the display module, the power cable being disposed on the first surface;
 a data cable including a socket or a plug, for providing a data signal for displaying an image on the display module to the display module, the data cable being disposed on the first surface; and
 a plurality of connectors disposed on and fixed to the first surface of the flexible substrate, the plurality of connectors being separately provided from the power cable including the socket or the plug and the data cable including the socket or the plug, wherein:
 the power cable is configured to be connected to a power cable of another display module in a direction parallel to the first surface,
 the data cable is configured to be connected to a data cable of another display module in a direction parallel to the first surface,
 the plurality of connectors comprise a first male connector and a second male connector, and a first female connector and a second female connector,
 structures of the first male connector and the second male connector are different and structures of the first female connector and the second female connector are different, and
 the LED display module further comprises a housing plate disposed on the first surface, wherein:
 the first male connector comprises:
  a base portion having an aperture for receiving a fastener for fixing the male connector to the flexible substrate;
  a head portion extending the base portion and having a step for being rested on the housing plate; and
  a projection disposed on the head portion to be inserted into a hole,
 the second male connector comprises:
  an L-shape base portion having an aperture for receiving a fastener for fixing the male connector to the flexible substrate; and
  a projection disposed on the L-shaped head portion to be inserted into a hole, the first female connector comprises:
  a base portion having an aperture for receiving a fastener for fixing the female connector to the flexible substrate;
  a head portion extending the base portion and having a step for being rested on the housing plate; and
  a hole disposed on the head portion to receive a projection, and
 the second female connector comprises:
  an L-shape base portion having an aperture for receiving a fastener for fixing the female connector to the flexible substrate; and a hole portion disposed on the L-shaped head portion to receive a projection.

2. The LED display module of claim 1, wherein a height of the power cable from the first surface of the flexible substrate is not higher than heights of all components disposed on the first surface of the flexible substrate.

3. The LED display module of claim 1, wherein a height of the data cable from the first surface of the flexible substrate is not higher than a height of all components disposed on the first surface of the flexible substrate.

4. The LED display module of claim 1, wherein the power cable extends beyond the flexible substrate of the display module.

5. The LED display module of claim 1, wherein:
the data cable includes a first data cable and a second data cable, and the first data cable includes the plug and the second data cable includes a socket.

6. The LED display module of claim 1, wherein the L-shaped base portion is fixed to the flexible substrate without interposing the housing plate.

7. The LED display module of claim 1, further comprising a strengthening member to restrict a bending amount of the display module.

8. A light emitting diode (LED) display screen comprising a plurality of LED display modules, each of the plurality of LED display modules comprising:
a flexible substrate having a first surface and a second surface which is opposite to the first surface and on which a plurality of LEDs are disposed;
a power cable having a socket or a plug, for providing power to the display module, the power cable being disposed on the first surface;
a data cable having a socket or a plug, for providing a data signal for displaying an image on the display module to the display module, the data cable being disposed on the first surface; and
a plurality of connectors disposed on the first surface and fixed to the flexible substrate, the plurality of connectors including a male connector and a female connector, and the plurality of connectors being separately provided from the power cable including the socket or the plug and the data cable including the socket or the plug, wherein:
the male connector of one of the display modules is connected to the female connector of adjacent one of the plurality of display modules,
the power cable is configured to be connected to a power cable of adjacent one of the display modules in a direction parallel to the first surface,
the data cable is configured to be connected to a data cable of adjacent one of the display modules in a direction parallel to the first surface,
the male connector comprises a first male connector and a second male connector, and the female connector comprises a first female connector and a second female connector,
structures of the first male connector and the second male connector are different and structures of the first female connector and the second female connector are different,
the first male connector of one of the display modules is connected to the first female connector or the second female connector of adjacent one of the plurality of display modules,
the second male connector of one of the display modules is connected to the first female connector or the second female connector of adjacent one of the plurality of display modules, each of the plurality of display modules further comprises a housing plate disposed on the first surface,
the first male connector comprises:
a base portion having an aperture for receiving a fastener for fixing the first male connector to the flexible substrate;
a head portion extending the base portion and having a step for being rested on the housing plate; and
a projection disposed on the head portion inserted into a hole of the first female connector or the second female connector of adjacent one of the plurality of display modules,
the second male connector comprises:
an L-shape base portion having an aperture for receiving a fastener for fixing the male connector to the flexible substrate; and
a projection disposed on the L-shaped head portion inserted into a hole of the first female connector or the second female connector of adjacent one of the plurality of display modules,
the first female connector comprises:
a base portion having an aperture for receiving a fastener for fixing the female connector to the flexible substrate;
a head portion extending the base portion and having a step for being rested on the housing plate; and
the hole disposed on the head portion receiving the projection of the first male connector or the second male connector of adjacent one of the plurality of display modules, and
the second female connector comprises:
an L-shape base portion having an aperture for receiving a fastener for fixing the female connector to the flexible substrate; and
the hole portion disposed on the L-shaped head portion receiving the projection of the first male connector or the second male connector of adjacent one of the plurality of display modules.

9. The LED display screen of claim 8, wherein a height of the power cable from the first surface of the flexible substrate is not higher than heights of all components disposed on the first surface.

10. The LED display screen of claim 8, wherein a height of the data cable from the first surface of the flexible substrate is not higher than heights of all components disposed on the first surface.

11. The LED display screen of claim 8, wherein the socket of the power cable of one of the display modules is connected to the plug of the power cable of adjacent one of the display modules.

12. The LED display screen of claim 8, wherein:
the data cable includes a first data cable having the plug and a second data cable having the socket, and
the socket of one of the display modules is connected to the plug of adjacent one of the display modules.

13. The LED display screen of claim 11, further comprising a power unit for supplying power to the plurality of display module,
wherein the power cable is connected to the power unit by a plurality of connecting cables each of which is connected to the power cable of different display modules.

14. The LED display screen of claim 12, further comprising a data unit for supplying data signals to the plurality of display module,
wherein the data cable is connected to the data unit by a plurality of connecting cables each of which is connected to the data cable of different display modules.

15. The LED display screen of claim 8, wherein each of the plurality of display modules further comprises a strengthening member to restrict a bending amount of the display module.

16. The LED display screen of claim 15, wherein a difference between a pitch of the LEDs crossing a borderline of the display modules and a pitch of the LEDs within the display modules is less than 3% when the bending amount of the display module is restricted by the strengthening member.

* * * * *